US012718770B2

(12) United States Patent
Park et al.

(10) Patent No.: US 12,718,770 B2
(45) Date of Patent: Aug. 25, 2026

(54) DIGITAL-ANALOG CONVERTER, DATA DRIVING CIRCUIT, AND DISPLAY DEVICE

(71) Applicants: SAMSUNG DISPLAY CO., LTD., Yongin-si (KR); IUCF-HYU (Industry-University Cooperation Foundation Hanyang University), Seoul (KR)

(72) Inventors: Sungho Park, Yongin-si (KR); Jaemyung Lim, Seoul (KR); Junsoo Ko, Yongin-si (KR); Mungyu Kim, Yongin-si (KR); Hojun Kim, Seoul (KR); Nokyung Park, Yongin-si (KR); Han-Byul Lim, Yongin-si (KR)

(73) Assignees: SAMSUNG DISPLAY CO., LTD., Yongin-si (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 0 days.

(21) Appl. No.: 18/976,754

(22) Filed: Dec. 11, 2024

(65) Prior Publication Data

US 2025/0273171 A1 Aug. 28, 2025

(30) Foreign Application Priority Data

Feb. 23, 2024 (KR) ........................ 10-2024-0026487

(51) Int. Cl.
*G09G 3/3275* (2016.01)
*G09G 3/32* (2016.01)

(52) U.S. Cl.
CPC ............. *G09G 3/3275* (2013.01); *G09G 3/32* (2013.01); *G09G 2300/0828* (2013.01);
(Continued)

(58) Field of Classification Search
CPC ..................................................... G09G 3/3275
See application file for complete search history.

(56) References Cited

U.S. PATENT DOCUMENTS

| | | | |
|---|---|---|---|
| 10,217,393 | B2 | 2/2019 | Noh et al. |
| 11,721,265 | B1 | 8/2023 | Ma et al. |

(Continued)

FOREIGN PATENT DOCUMENTS

| | | | |
|---|---|---|---|
| KR | 10-0819427 | B1 | 4/2008 |
| KR | 10-1615732 | B1 | 5/2016 |

(Continued)

OTHER PUBLICATIONS

Sung ,et al, "10-bit source driver with resistor-resistor-string digital-to-analog converter", Journal of the SID 14/4, 2006, pp. 371-377.

(Continued)

*Primary Examiner* — William Boddie
*Assistant Examiner* — Andrew B Schnirel
(74) *Attorney, Agent, or Firm* — F. CHAU & ASSOCIATES, LLC

(57) ABSTRACT

A data driving circuit of a display device includes a digital-analog converter which includes a gamma reference voltage generator to output gamma reference voltages in response to a first-group signal of a digital signal, and a voltage selector to output, as a gamma selection voltage, one of the gamma reference voltages in response to a second-group signal of the digital signal. The data driving circuit also includes a first amplifier to receive the gamma selection voltage and to output a first conversion voltage, a boosting circuit to convert the first conversion voltage into a second conversion voltage in response to the first-group signal of the digital signal, and a second amplifier to receive the second conversion voltage and to output an analog signal.

20 Claims, 9 Drawing Sheets

(52) U.S. Cl.
CPC ................. *G09G 2310/027* (2013.01); *G09G 2310/0275* (2013.01); *G09G 2310/0297* (2013.01); *G09G 2310/08* (2013.01); *G09G 2330/021* (2013.01); *G09G 2330/028* (2013.01)

(56) References Cited

U.S. PATENT DOCUMENTS

| | | | | |
|---|---|---|---|---|
| 2003/0201959 | A1* | 10/2003 | Sakaguchi | G09G 3/3696 345/87 |
| 2006/0092119 | A1* | 5/2006 | Kim | G09G 3/3688 345/98 |
| 2009/0051575 | A1* | 2/2009 | Lee | H03M 1/682 341/144 |
| 2009/0160882 | A1* | 6/2009 | Kiya | G09G 3/2007 345/212 |
| 2011/0050670 | A1* | 3/2011 | Kim | G06F 1/30 323/304 |
| 2021/0183293 | A1* | 6/2021 | Piao | G09G 3/20 |
| 2023/0306916 | A1* | 9/2023 | Chae | G09G 3/3291 |

FOREIGN PATENT DOCUMENTS

| | | | |
|---|---|---|---|
| KR | 10-1654355 | B1 | 9/2016 |
| KR | 10-2068145 | B1 | 1/2020 |
| KR | 10-2023-0124162 | A | 8/2023 |
| KR | 10-2585457 | B1 | 10/2023 |

OTHER PUBLICATIONS

Lim, et al., "A 10b Source-Driver IC with LSB-Stacked LV-to-HV-Amplify DAC Achieving 2688μm2channel and 4.8mV DVO for Mobile OLED Displays", ISSCC 2022, pp. 110-112.

* cited by examiner

DIGITAL-ANALOG CONVERTER, DATA DRIVING CIRCUIT, AND DISPLAY DEVICE

CROSS-REFERENCE TO RELATED APPLICATIONS

This application claims priority under 35 U.S.C. § 119 to Korean Patent Application No. 10-2024-0026487, filed on Feb. 23, 2024, in the Korean Intellectual Property Office, the disclosure of which is incorporated by reference herein in its entirety.

BACKGROUND

1. Technical Field

Embodiments of the present disclosure described herein relate to a display device, and more particularly, relate to a display device including a data driving circuit.

2. Description of the Related Art

A variety of electronic devices have been developed with include display devices. Examples include smart phones, digital cameras, notebook computers, navigation systems, monitors, and smart televisions. The display device generates an image and provides the generated image to the user through a display screen.

Generally, the display device includes a display panel, a data driving circuit, and a driving controller. The driving controller provides an image data signal. The data driving circuit may provide data signals corresponding to the image data signal to the display panel.

SUMMARY

Embodiments of the present disclosure provide a digital-analog converter of a data driving circuit for a display device which has lower power consumption.

One or more embodiments of the present disclosure is to provide a digital-analog converter of a data driving circuit for a display device that is reduced in size.

According to an embodiment of the present disclosure, a digital-analog converter includes a gamma reference voltage generator to output gamma reference voltages, in response to a first-group signal of a digital signal, a voltage selector to output, as a gamma selection voltage, one of the gamma reference voltages, in response to a second-group signal of the digital signal, a first amplifier to receive the gamma selection voltage and to output a first conversion voltage, a boosting circuit to convert the first conversion voltage into a second conversion voltage, in response to the first-group signal of the digital signal, and a second amplifier to receive the second conversion voltage and to output an analog signal.

According to an embodiment, the gamma reference voltage generator may include a first voltage generator to generate first gamma reference voltages, in response to the first-group signal of the digital signal, and a second voltage generator to generate second gamma reference voltages, in response to the first-group signal of the digital signal. One of the first gamma reference voltages and the second gamma reference voltages may be output as the gamma reference voltages.

According to an embodiment, the first voltage generator may include a first resistor string including a plurality of resistors to generate the first gamma reference voltages, and a first switching circuit to output the first gamma reference voltages as the gamma reference voltages, in response to the first-group signal of the digital signal.

According to an embodiment, the plurality of resistors of the first resistor string may have mutually different resistances.

According to an embodiment, the second voltage generator may include a second resistor string including a plurality of resistors to generate the second gamma reference voltages, a second switching circuit to output some of the second gamma reference voltages as the gamma reference voltages, a third switching circuit to output some of the second gamma reference voltages as the gamma reference voltages, and a fourth switching circuit to output some of the second gamma reference voltages as the gamma reference voltages. One of the second, third, and fourth switching circuits may operate in response to the first-group signal of the digital signal.

According to an embodiment, the plurality of resistors of the second resistor string may have mutually different resistances.

According to an embodiment, the boosting circuit may include a first capacitor connected between a first node to receive the first conversion voltage and a second node, and a boosting switching circuit to transmit one of a plurality of boosting voltages to the second node, in response to the first-group signal of the digital signal.

According to an embodiment, the boosting switching circuit may include a first boosting switch connected between the second node and a first voltage terminal, and a second boosting switch connected between the second node and a second voltage terminal. One of the first boosting switch and the second boosting switch may be turned on, in response to the first-group signal of the digital signal.

According to an embodiment, the boosting switching circuit may further include a second capacitor between the first node and a ground terminal.

According to an embodiment, the first capacitor may be a metal-oxide-semiconductor (MOS) capacitor.

According to an embodiment, the second amplifier may include a first input terminal to receive the second conversion voltage, a second input terminal, and an output terminal to output the analog signal, and the second input terminal and the output terminal may be electrically connected to each other.

According to an embodiment, the boosting circuit may further include a first switch connected between an output terminal of the first amplifier and the first node, a second switch connected between the first node and a third node, a third switch connected between a voltage terminal to receive a reference voltage and the third node, and a fourth switch connected between the second node and the second input terminal of the second amplifier. The first input terminal of the second amplifier may be connected to the third node, each of the first switch, the third switch, and the fourth switch may be turned on in response to a reset signal, and the second switch may be turned on, in response to an inverted reset signal.

According to an embodiment, the second amplifier may include a first input terminal to receive the second conversion voltage, a second input terminal, and an output terminal to output the analog signal, and electrically connected to the second input terminal. The boosting circuit may further include a first capacitor connected between a first node and a second node, a boosting switching circuit to transmit one of a plurality of boosting voltages to the first node, in response to the first-group signal of the digital signal, a first switch connected between an output terminal of the first amplifier and the second node, a second switch connected between the first node and a third node, a third switch connected between a voltage terminal to receive a reference voltage and the third node, and a fourth switch connected between the second node and the second input terminal of the second amplifier, The first input terminal of the second amplifier may be connected to the third node, each of the third switch, and the fourth switch may be turned on in response to a reset signal, and each of the first switch and the second switch may be turned on in response to an inverted reset signal.

According to an embodiment of the present disclosure, a data driving circuit includes a digital-analog converter to convert an image data signal to an analog signal, and a demultiplexer to receive the analog signal and output a data signal. The digital-analog converter includes a gamma reference voltage generator to output gamma reference voltages, in response to a first-group signal of the image data signal, a voltage selector to output, as a gamma selection voltage, one of the gamma reference voltages, in response to a second-group signal of the image data signal, a first amplifier to receive the gamma selection voltage and output a first conversion voltage, a boosting circuit to convert the first conversion voltage to a second conversion voltage, in response to the first-group signal of the image data signal, and a second amplifier to receive the second conversion voltage and output the analog signal.

According to an embodiment, the gamma reference voltage generator may include a first gamma voltage generator to generate first gamma reference voltages, in response to the first-group signal of the image data signal, and a second gamma voltage generator to generate second gamma reference voltages, in response to the first-group signal of the image data signal. One of the first gamma reference voltages and the second gamma reference voltages may be output as the gamma reference voltages.

According to an embodiment, the boosting circuit may include a first capacitor connected between a first node to receive the first conversion voltage and a second node, and a boosting switching circuit to transmit one of a plurality of boosting voltages to the second node, in response to the first-group signal of the image data signal.

According to an embodiment of the present disclosure, a display device includes a display panel, a scan driving circuit to provide a scan signal to the display panel, a data driving circuit to provide a data signal to the display panel, and a driving controller to provide an image data signal to the data driving circuit. The data driving circuit includes a digital-analog converter to convert the image data signal to an analog signal, and a demultiplexer to receive the analog signal and output a data signal, The digital-analog converter includes a gamma reference voltage generator to output gamma reference voltages, in response to a first-group signal of the image data signal, a voltage selector to output, as a gamma selection voltage, one of the gamma reference voltages, in response to a second-group signal of the image data signal, a first amplifier to receive the gamma selection voltage and output a first conversion voltage, a boosting circuit to convert the first conversion voltage to a second conversion voltage, in response to the first-group signal of the image data signal, and a second amplifier to receive the second conversion voltage and output the analog signal.

According to an embodiment, the gamma reference voltage generator may include a first voltage generator to generate first gamma reference voltages, in response to the first-group signal of the image data signal and a second voltage generator to generate second gamma reference voltages, in response to the first-group signal of the image data. One of the first gamma reference voltages and the second gamma reference voltages may be output as the gamma reference voltages.

According to an embodiment, the boosting circuit may include a first capacitor connected between a first node to receive the first conversion voltage and a second node, and a boosting switching circuit to transmit one of a plurality of boosting voltages to the second node, in response to the first-group signal of the image data signal.

According to an embodiment, the first capacitor may be an MOS capacitor.

According to one or more additional embodiments, a data driving circuit of a display device, includes a first voltage generator configured to output a first set of gamma reference voltages based on a first value of a first predetermined number of bits of an image data signal; a second voltage generator configured to generate a second set of gamma reference voltages based on a second value of the first predetermined number of bits of the image data signal; a voltage selector configured to select one of the gamma reference voltages in the first set of gamma reference voltages or the second set of gamma reference voltages based on a value of a second predetermined number of bits of the image data signal; and a boosting circuit configured to generate a conversion voltage based on the selected one of the gamma reference voltages, the conversion voltage corresponding to an analog voltage to be output from the data driving circuit to a pixel of the display device.

The first set of gamma reference voltages are generated based on a first highest voltage, and the second set of gamma voltages are generated based on a second highest voltage different from the first highest voltage. The first predetermined number of bits and the second predetermined number of bits correspond to a gray level of the image data signal.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
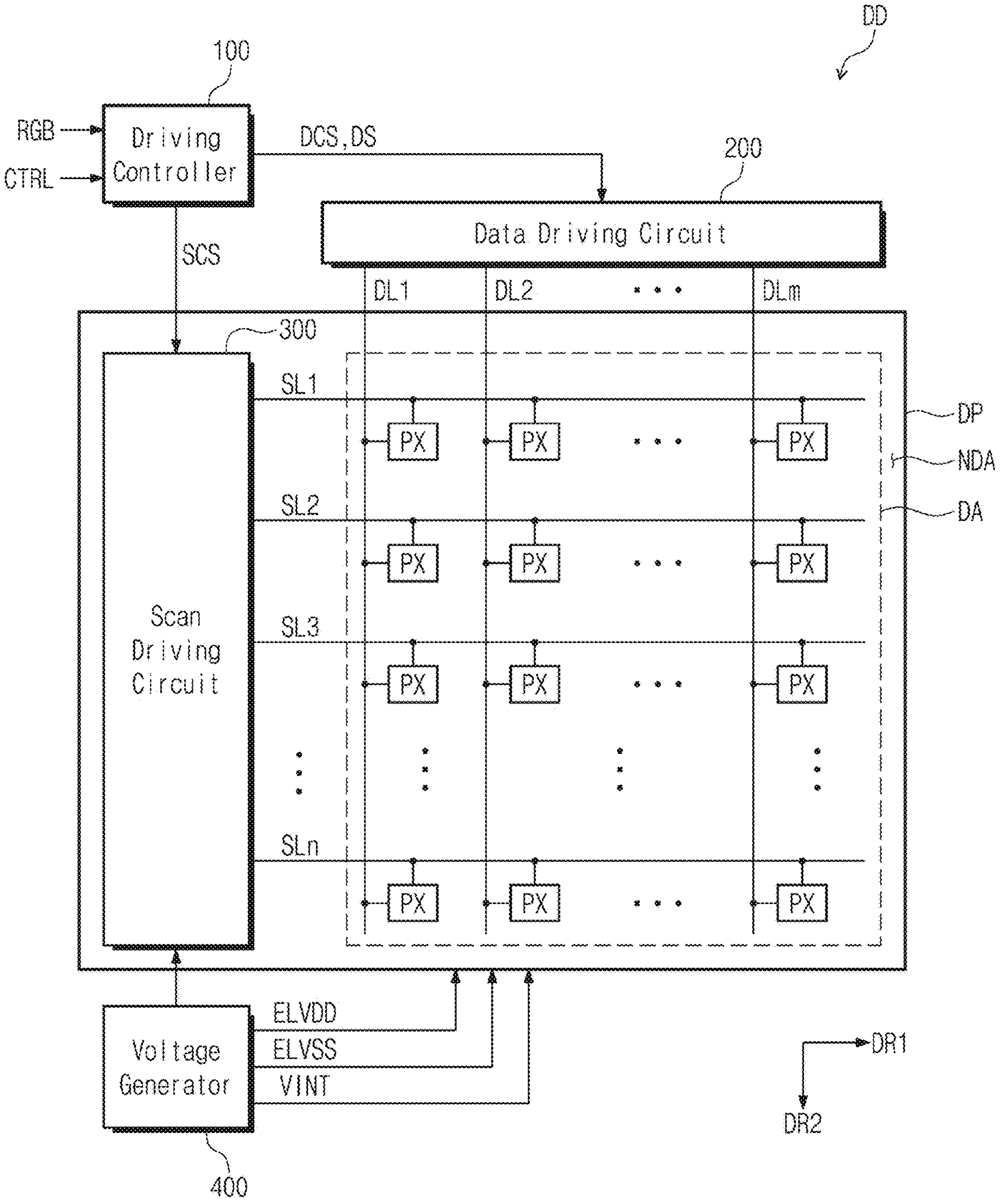
FIG. 1 is a block diagram of a display device according to an embodiment of the present disclosure.

In the specification, the expression that a first component (or region, layer, part, portion, etc.) is "on", "connected to", or "coupled to" a second component means that the first component is directly on, connected to, or coupled to the second component or means that a third component is interposed therebetween.

The same reference numerals will be assigned to the same elements in drawings. In addition, in drawings, thicknesses, proportions, and dimensions of components may be exaggerated to describe the technical features effectively. The term "and/or" includes any and all combinations of one or more of associated components Although the terms "first", "second", etc. may be used to describe various components, the components should not be construed as being limited by the terms. The terms are only used to distinguish one component from another component. For example, without departing from the scope and spirit of the invention, a first component may be referred to as a second component, and similarly, the second component may be referred to as the first component. The singular forms are intended to include the plural forms unless the context clearly indicates otherwise.

In addition, the terms "under", "at a lower portion", "above", "an upper portion" are used to describe the relationship between components illustrated in drawings. The terms are relative and are described with reference to a direction indicated in the drawing.

It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device DD according to an embodiment of the present disclosure.

Referring to FIG. 1, the display device DD includes a driving controller 100, a data driving circuit 200, a scan driving circuit 300, a voltage generator 400, and a display panel DP. The driving controller 100 receives an input image signal RGB and a control signal CTRL. The driving controller 100 provides a data control signal DCS and an image data signal DS to the data driving circuit 200. The driving controller 100 provides a scan control signal SCS to the scan driving circuit 300.

The data driving circuit 200 receives the data control signal DCS and the image data signal DS from the driving controller 100. The data driving circuit 200 converts the image data signal DS into data signals, and outputs the data signals to respective ones of a plurality of data lines DL1 to DLm to be described later. The data signals are analog voltages corresponding to the image data signal DS.

The scan driving circuit 300 receives the scan control signal SCS from the driving controller 100. The scan driving circuit 300 outputs scan signals to a plurality of scan lines SL1 to SLn to be described in greater detail later. According to an embodiment, the scan signals provided to the plurality of scan lines SL1 to SLn may be provided according to a predetermined pattern (e.g., sequentially shifted) to be in an activation level.

According to an embodiment of the present disclosure, the display panel DP may be or include an emissive display panel. For example, the display panel DP may be an organic light emitting display panel, an inorganic light emitting display panel, or an quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot and a quantum rod. Hereinafter, the display panel DP according to the present embodiment will be referred to as an organic light emitting display panel.

The display panel DP includes the scan lines SL1 to SLn, the data lines DL1 to DLm, and pixels PX. Each of the pixels PX may be connected to a corresponding scan line of the scan lines SL1 to SLn and a corresponding data line of the data lines DL1 to DLm. Although FIG. 1 illustrates that one pixel PX is connected to one scan line, the present disclosure is not limited thereto. In some embodiments, each pixel PX may be electrically connected to multiple (e.g., two) scan lines.

Each pixel PX may include at least one light emitting element and a pixel circuit unit to control a light emitting operation of the light emitting element. According to an embodiment, the light emitting element may be an organic light emitting diode. However, the present disclosure is not limited thereto.

The scan lines SL1 to SLn extend in a first direction DR1 from the scan driving circuit 300, and may be arranged to be spaced apart from each other in a second direction DR2 crossing the first direction DR1. The data lines DL1 to DLm extend in the second direction DR2 from the data driving circuit 200, and may be arranged to be spaced apart from each other in the first direction DR1. The spacing between adjacent ones of the data lines DL1 to DLm may be based on the spacing between the pixels PX.

The scan driving circuit 300 may be provided on the display panel DP. According to an embodiment, the pixels PX may be disposed in a display region DA of the display panel DP, and the scan driving circuit 300 may be disposed in a non-display region NDA of the display panel DP. As shown, the scan driving circuit 300 is located on a left side of the display panel, but the scan driving circuit 300 may be at another location relative to the display panel DP in other embodiments. Moreover, according to an embodiment, the scan driving circuit 300 may be formed in the same process as that of a pixel circuit of each of the pixels PX. However, the present disclosure is not limited thereto, e.g., the scan driving circuit 300 and the pixel circuit of each of the pixels PX may be formed by different processes.

The voltage generator 400 provides a plurality of voltages, for example, a first voltage ELVDD, a second voltage ELVSS, and a third voltage VINT for operation of the display panel DP. The number of voltages generated from the voltage generator 400 may vary among embodiments and, for example, based on the specific configuration of the pixels PX.

Figure 2:
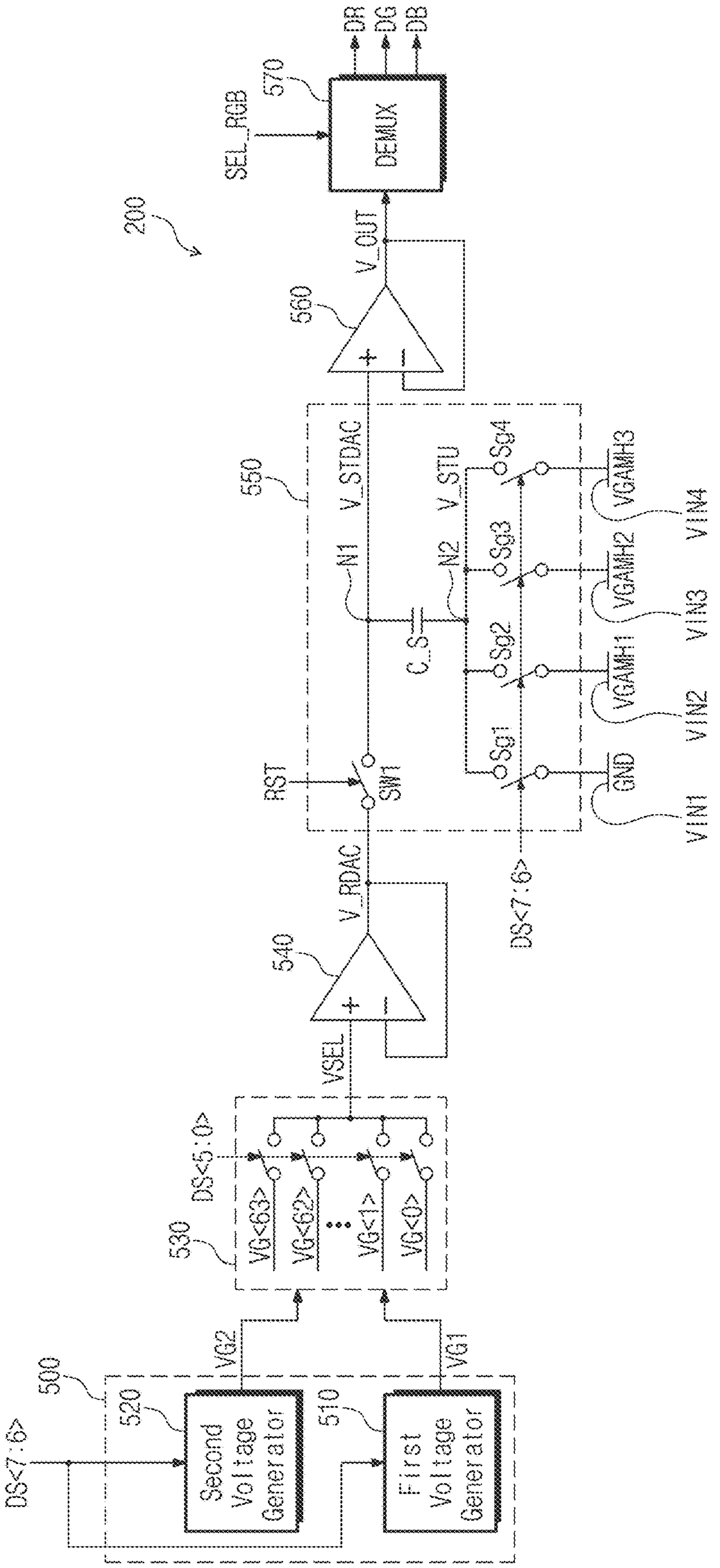
FIG. 2 is a view illustrating a data driving circuit according to an embodiment of the present disclosure.
Figure 3:
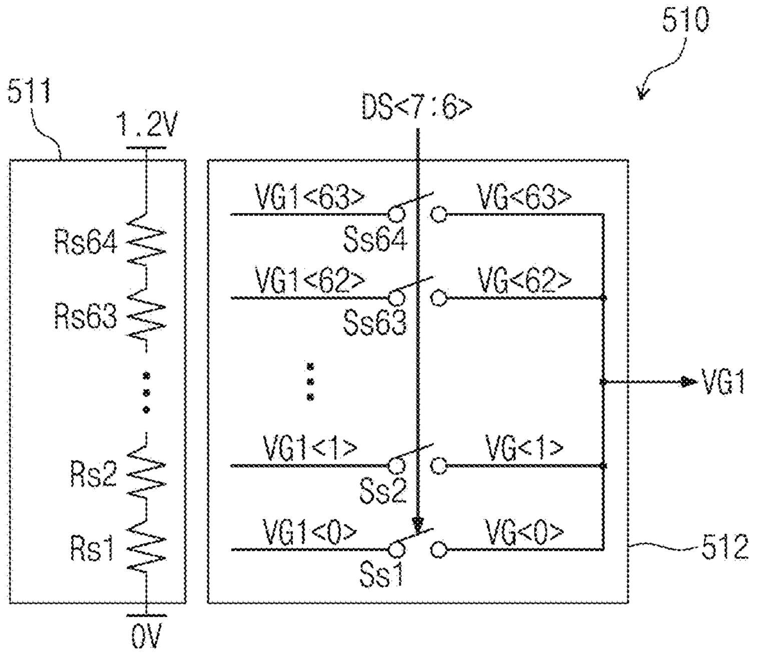
FIG. 3 is a view illustrating a first voltage generator according to an embodiment.
Figure 4:
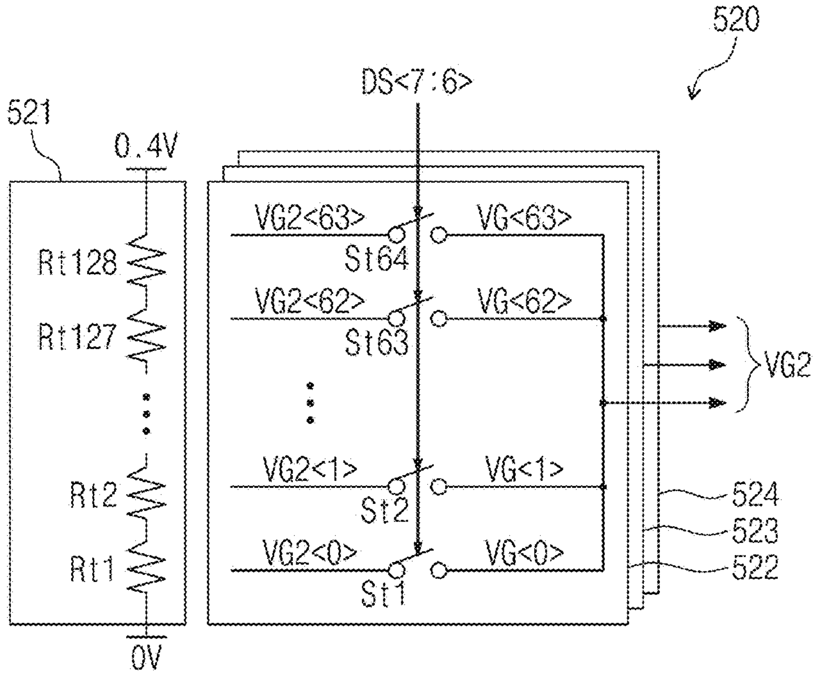
FIG. 4 is a view illustrating a second voltage generator according to an embodiment.

FIG. 2 is a view illustrating the data driving circuit 200 according to an embodiment of the present disclosure. FIG. 3 is a view illustrating a first voltage generator 510 of the data driving circuit 200. FIG. 4 is a view illustrating a second voltage generator 520 of the data driving circuit 200.

Referring to FIG. 2, the data driving circuit 200 includes a digital-analog converter and a demultiplexer 570. The digital-analog converter includes a gamma reference voltage generator 500, a voltage selector 530, a first amplifier 540, a boosting circuit 550, and a second amplifier 560. According to an embodiment, each of the first amplifier 540 and the second amplifier 560 may serve as a buffer.

The gamma reference voltage generator 500 outputs a plurality of gamma reference voltages in response to a first-group signal of a digital signal. According to an embodiment, the digital signal is the image data signal DS shown, for example, in FIG. 1. The first-group signal may be an n-bit signal, where n>1. In one embodiment, the first-group signal may be the most significant 2-bit signal DS<7:6> of the image data signal DS. The gamma reference voltage generator 500 may output a plurality of gamma reference voltages by selecting one of first gamma reference voltages VG1 or the second gamma reference voltages VG2.

The gamma reference voltage generator 500 includes the first voltage generator 510 and the second voltage generator 520. The first voltage generator 510 outputs the first gamma reference voltages VG1 (e.g., a first set of gamma reference voltages) in response to the most significant 2-bit signal DS<7:6> of the image data signal DS. The second voltage generator 520 outputs the second gamma reference voltages VG2 (e.g., a second set of gamma reference voltages), in response to the most significant 2-bit signal DS<7:6> of the image data signal DS. Thus, as will be described in greater detail below, different sets of gamma reference voltages may be used based on different values of the gray levels of the image data signal DS. In one embodiment, the number of switching circuits among the first voltage generator 510 and the second voltage generator 520 may be the same as the number of gray level ranges the most significant n-bit signal DS are divided into.

Referring to FIG. 3, the first voltage generator 510 includes a first resistor string 511 and a first switching circuit 512. The first resistor string 511 includes a plurality of resistors Rs1, Rs2, . . . , Rs63, and Rs64 connected to each other in series between the lowest voltage (for example, 0 V) and the first highest voltage (for example, 1.2 V). Although FIG. 3 illustrates that the first resistor string 511 includes 64 resistors Rs1, Rs2, . . . , Rs63, and Rs64, the present disclosure is not limited thereto. The number of resistors included in the first resistor string 511 may be vary among embodiments. According to an embodiment, the resistors Rs1, Rs2, . . . , Rs63, and Rs64 may have mutually different resistances.

The first switching circuit 512 includes a plurality of first switches Ss1, Ss2, . . . , Ss63, and Ss64. Although FIG. 3 illustrates that the first switching circuit 512 includes 64 first switches Ss1, Ss2, . . . , Ss63, and Ss64, the present disclosure is not limited thereto. The number of first switches included in the first switching circuit 512 may be different in other embodiments. The number of first switches Ss1, Ss2, . . . , Ss63, and Ss64 may be the same as the number of resistors Rs1, Rs2, . . . , Rs63, and Rs64.

According to an embodiment, the first resistor string 511 may output voltages across connection nodes between adjacent pairs of the resistors Rs1, Rs2, . . . , Rs63, and Rs64 as first gamma reference voltages VG1<0>, VG1<1>, . . . , VG1<6>, . . . and VG1<63>. For example, the lowest voltage may be output as the first gamma reference voltage VG1<0>. For example, the voltage across the connection node between the resistors Rs1 and Rs2 may be output as the first gamma reference voltage VG1<1>. The voltage across the connection node between the resistors Rs63 and Rs64 may be output as the first gamma reference voltage VG1<63>.

The first switching circuit 512 may output the first gamma reference voltages VG1<0>, VG1<1>, . . . , VG1<6>, . . . and VG1<63> from the first resistor string 511 as gamma reference voltages VG<0>, VG<1>, . . . , VG<62>, and VG<63>, in response to the most significant 2-bit signal DS<7:6> of the image data signal DS. The gamma reference voltages VG<0>, VG<1>, . . . , VG<62>, and VG<63> output from the first switching circuit 512 may be provided to the voltage selector 530 illustrated in FIG. 2 while serving as the first gamma reference voltages VG1.

Referring to FIG. 4, the second voltage generator 520 includes a second resistor string 521, a second switching circuit 522, a third switching circuit 523, and a fourth switching circuit 524. The second resistor string 521 includes a plurality of resistors Rt1, Rt2, . . . , Rt127, and Rt128 connected to each other in series between the lowest voltage (e.g., 0 V) and the second highest voltage (e.g., 0.4 V). The second highest voltage may be different from the first highest voltage in the first resistor string 511. Although FIG. 4 illustrates that the second resistor string 521 includes 128 resistors Rt1, Rt2, . . . , Rt127, and Rt128, the present disclosure is not limited thereto. The number of resistors included in the second resistor string 521 may be vary among embodiments. According to an embodiment, the resistors Rt1, Rt2, . . . , Rt127, and Rt128 may have mutually different resistances.

The second switching circuit 522 includes a plurality of second switches St1, St2, . . . , St63, and St64. The number of second switches St1, St2, . . . , St63, and St64 may be different from the number of resistors Rt1, Rt2, . . . , Rt127, and Rt128. Although FIG. 3 illustrates 64 second switches St1, St2, . . . , St63, and St64, the present disclosure is not limited thereto. The number of second switches included in the second switching circuit 522 may vary among embodiments.

According to an embodiment, the second resistor string 521 may output second gamma voltages across connection nodes among the resistors Rt1, Rt2, . . . , Rt127, and Rt128. For example, the second resistor string 521 may output 128 second gamma reference voltages.

The second switching circuit 522 may output 64 second gamma reference voltages VG2<0>, VG2<1>, . . . , VG2<62>, and VG2<63> among the 128 second gamma reference voltages from the second resistor string 521, as the gamma reference voltages VG<0>, VG<1>, . . . , VG<62>, and VG<63>, in response to the most significant 2-bit signal DS<7:6> of the image data signal DS. The gamma reference voltages VG<0>, VG<1>, . . . , VG<62>, and VG<63> output from the second switching circuit 522 may be provided to the voltage selector 530 illustrated in FIG. 2 while serving as the second gamma reference voltages VG2. Some of the 64 second gamma reference voltages VG2<0>, VG2<1>, . . . , VG2<62>, and VG2<63> selected by the second switching circuit 522 may be the same voltages.

Each of the third switching circuit 523 and the fourth switching circuit 524 may have a circuit configuration similar to that of the second switching circuit 522. The third switching circuit 523 may output the 64 second gamma reference voltages VG2<0>, VG2<1>, . . . , VG2<62>, and VG2<63> among 128 second gamma reference voltages from the second resistor string 521, as gamma reference voltages VG<0>, VG<2>, . . . , VG<62>, and VG<63>. Some of the 64 second gamma reference voltages VG2<0>, VG2<1>, . . . , VG2<62>, and VG2<63> selected by the third switching circuit 523 may be the same voltages.

The fourth switching circuit 524 may output the 64 second gamma reference voltages VG2<0>, VG2<1>, . . . , VG2<62>, and VG2<63> among 128 second gamma reference voltages from the second resistor string 521, as the gamma reference voltages VG<0>, VG<1>, . . . , VG<62>, and VG<63>. Some of 64 second gamma reference voltages VG2<0>, VG2<1>, . . . , VG2<62>, and VG2<63> selected by the fourth switching circuit 524 may be the same voltages.

According to an embodiment, the 64 second gamma reference voltages VG2<0>, VG2<1>, . . . , VG2<62>, and VG2<63> selected by the third switching circuit 523 may be voltages different from 64 second gamma reference voltages VG2<0>, VG2<1>, VG2<62>, and VG2<63> selected by the second switching circuit 522, and 64 second gamma reference voltages VG2<0>, VG2<1>, . . . , VG2<62>, and VG2<63> selected by the fourth switching circuit 524. In one embodiment, the 64 second gamma reference voltages VG2<0>, VG2<1>, . . . VG2<62>, and VG2<63> selected by the second switching circuit 522 may be voltages different from the 64 second gamma reference voltages VG2<0>, VG2<1>, . . . VG2<62>, and VG2<63> selected by the fourth switching circuit 524.

The most significant 2-bit signal DS<7:6> may have four possible values. Referring to FIGS. 3 and 4, when the most significant 2-bit signal DS<7:6> of the image data signal DS has a value of '00', the first switching circuit 512 may output the first gamma reference voltages VG1<0>, VG1<1>, . . . , VG1<62>, and VG1<63> from the first resistor string 511, as the gamma reference voltages VG<0>, VG<1>, . . . VG<62>, and VG<63> corresponding to the first gamma reference voltages VG1. For example, when the gray level of the image data signal DS corresponds to the gray level from 1 to 64 gray levels, the first switching circuit 512 may output the gamma reference voltages VG<0>, VG<1>, . . . , VG<62>, and VG<63> as shown in FIG. 3.

When the most significant 2-bit signal DS<7:6> of the image data signal DS has a value of '01', the second switching circuit 522 may output the second gamma reference voltages VG2<0>, VG2<1>, . . . , VG2<62>, and VG2<63> selected among 128 second gamma reference voltages from the second resistor string 521, as the gamma reference voltages VG<0>, VG<2>, . . . , VG<62>, and VG<63> corresponding to the second gamma reference voltages VG2. For example, when the gray level of the image data signal DS corresponds to the gray level from 65 to 128 gray levels, the second switching circuit 522 may output the gamma reference voltages VG<0>, VG<1>, . . . , VG<62>, and VG<63>.

When the most significant 2-bit signal DS<7:6> of the image data signal DS has a value of '10', the third switching circuit 523 may output the second gamma reference voltages VG2<0>, VG2<1>, . . . , VG2<62>, and VG2<63> selected among 128 second gamma reference voltages from the second resistor string 521, as the gamma reference voltages VG<0>, VG<1>, . . . , VG<62>, and VG<63> corresponding to the second gamma reference voltages VG2. For example, when the gray level of the image data signal DS corresponds to the gray level from 129 to 192 gray levels, the third switching circuit 523 may output the gamma reference voltages VG<0>, VG<1>, . . . , and VG<62>, and VG<63>.

When the most significant 2-bit signal DS<7:6> of the image data signal DS has a value of '11', the fourth switching circuit 524 may output the second gamma reference voltages VG2<0>, VG2<1>, . . . , VG2<62>, and VG2<63> selected among 128 second gamma reference voltages from the second resistor string 521, as the gamma reference voltages VG<0>, VG<1>, . . . , VG<62>, and VG<63> corresponding to the second gamma reference voltages VG2. For example, when the gray level of the image data signal DS corresponds to the gray level from 193 to 256 gray levels, the fourth switching circuit 524 may output the gamma reference voltages VG<0>, VG<1>, . . . , VG<62>, and VG<63>. In one embodiment the gamma reference voltages VG<0>, VG<1>, . . . , VG<62>, and VG<63> output from the first switching circuit 521 to the fourth switching circuit 524 may be different depending on the value of the most significant 2-bit signal DS<7:6>.

Referring back to FIG. 2, the voltage selector 530 may output any one of the plurality of gamma reference voltages as the gamma selection voltage VSEL, in response to a second-group signal of the digital signal. According to an embodiment, the digital signal is the image data signal DS, and the second-group signal is the least significant 6-bit signal DS<5:0> of the image data signal DS. In this embodiment, the image data signal DS is indicated to have a total of eight bits, but the total number of bits in the image data signal may be different in another embodiment. Moreover, the least significant signal may correspond to a number of bits different from 6 bits in another embodiment.

Thus, the voltage selector 530 may output any one of the plurality of the gamma reference voltages VG<0>, VG<1>, . . . , VG<62>, and VG<63> as a gamma selection voltage VSEL in response to the least 6-bit signal DS<5:0> of the image data signal DS. The gamma reference voltages VG<0>, VG<1>, . . . , VG<62>, and VG<63> may be one of the first gamma reference voltages VG1 provided from the first voltage generator 510 or the second gamma reference voltages VG2 provided from the second voltage generator 520.

The first amplifier 540 includes a first (non-inverting) input terminal (+) for receiving the gamma selection voltage VSEL and a second (inverting) input terminal (−) connected to an output terminal of the first amplifier 540. The first amplifier 540 receives the gamma selection voltage VSEL and outputs a first conversion voltage V_RDAC.

The boosting circuit 550 converts the first conversion voltage V_RDAC into a second conversion voltage V_STDAC, in response to the signal of the first-group signal of the digital signal. The first-group signal of the digital signal may be the most significant 2-bit signal DS<7:6> of the image data signal DS.

In one embodiment, the boosting circuit 550 includes a switch SW1, a capacitor C_S, and a boosting switching circuit. The boosting switching circuit includes a parallel arrangement of boosting switches Sg1, Sg2, Sg3, and Sg4.

The switch SW1 is connected between the output terminal of the first amplifier 540 and a first node N1, and operates in response to a reset signal RST, which, for example, may be provided from the driving controller 100.

The capacitor C_S is connected between the first node N1 and a second node N2 of the boosting switching circuit.

The boosting switch Sg1 is connected between the second node N2 and a first voltage terminal VIN1. The boosting switch Sg2 is connected between the second node N2 and a second voltage terminal VIN2. The boosting switch Sg3 is connected between the second node N2 and a third voltage terminal VIN3. The boosting switch S4 is connected between the second node N2 and a fourth voltage terminal VIN4. The boosting switching circuit is shown to include four boosting switches Sg1, Sg2, Sg3, and Sg4 but may include a different number of boosting switches in another embodiment.

The first to fourth voltage terminals VIN1, VIN2, VIN3, and VIN4 receive the first to fourth boosting voltages GND, VGAMH1, VGAMH2, and VGAMH3, respectively. According to an embodiment, the first to fourth boosting voltages GND, VGAMH1, VGAMH2, and VGAMH3 may, for example, be provided from the voltage generator 400 illustrated in FIG. 1. The voltage levels of the first to fourth boosting voltages GND, VGAMH1, VGAMH2, and VGAMH3 may have the following relationship: GND<VGAMH1<VGAMH2<VGAMH3. The value of voltage GND may be at a reference potential, e.g., 0 V.

The boosting switches Sg1, Sg2, Sg3, and Sg4 may operate in response to the most significant 2-bit signal DS<7:6> of the image data signal DS. For example, when the most significant 2-bit signal DS<7:6> of the image data signal DS has a value of '00', the boosting switch Sg1 is turned on. When the most significant 2-bit signal DS<7:6> of the image data signal DS has a value of '01', the boosting switch Sg2 is turned on. When the most significant 2-bit signal DS<7:6> of the image data signal DS has a value of '10', the boosting switch Sg3 is turned on. When the most significant 2-bit signal DS<7:6> of the image data signal DS has a value of '11', the boosting switch Sg4 is turned on.

The second amplifier 560 includes a first (non-inverting) input terminal (+) for receiving the second conversion voltage V_STDAC across the first node N1, and a second (inverting) input terminal (−) connected to an output terminal of the second amplifier 560. The second amplifier 560 receives the second conversion voltage V_STDAC and outputs an analog signal V_OUT.

The demultiplexer 570 receives the analog signal V_OUT and outputs one of color data signals DR, DG, and DB, in response to the selection signal SEL_RGB, which, for example, may be output from the driving controller 100. The data signal DR corresponds to a pixel PX which emits red color light. The data signal DG corresponds to a pixel PX which emits green color light. The data signal DB corresponds to a pixel PX which emits blue color light.

Figure 5:
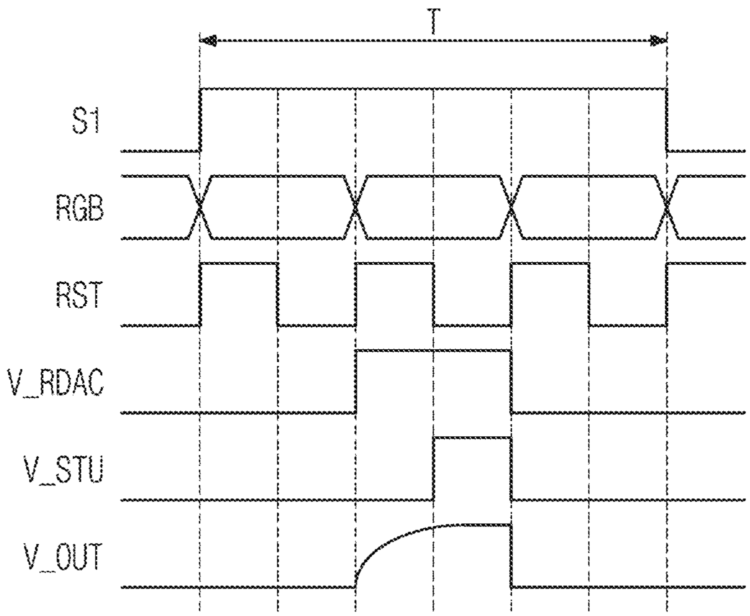
FIG. 5 is a timing diagram illustrating the operation of a data driving circuit illustrated in FIG. 2 according to an embodiment.

FIG. 5 is an example of a timing diagram illustrating operation of the data driving circuit illustrated in FIG. 2.

Referring to FIGS. 1, 2, and 5, when the reset signal RST is at a high level, the switch SW1 is turned on. In this case, the most significant 2-bit signal DS<7:6> of the image data signal DS and the first conversion voltage V_RDAC corresponding to the least significant 6-bit signal DS<5:0> of the image data signal DS may be transmitted to the first node N1. Meanwhile, when any one of the boosting switches Sg1, Sg2, Sg3, and Sg4 is turned on, in response to the most significant 2-bit signal DS<7:6> of the image data signal DS, the voltage V_STU across the second node N2 is changed to a respective one of the first to fourth boosting voltages GND, VGAMH1, VGAMH2, and VGAMH3. In this case, the second conversion voltage V_STDAC across the first node N1 is a voltage boosted from the first conversion voltage V_RDAC by the voltage V_STU, which is applied across the second node N2 through the capacitor C_S. Accordingly, the analog signal V_OUT output from the second amplifier 560 may have a voltage level corresponding to the second conversion voltage V_STDAC across the first node N1.

During the high level of a scan signal S1 provided to the scan line SL1 (e.g., during one cycle T), the demultiplexer 570 may receive the analog signal V_OUT and sequentially output one or more of the data signals DR, DG, and DB, in response to the selection signal SEL_RGB.

As described above, the digital-to-analog converter may operate in two phases.

During a first phase, voltages corresponding to the digital signal (e.g., the image data signal DS), among voltages of the first resistor string 511 and the second resistor string 521, are output as the first conversion voltage V_RDAC.

During a second phase, the second conversion voltage V_STDAC is generated by stacking up any one of the first to fourth boosting voltages GND, VGAMH1, VGAMH2, and VGAMH3 from the first conversion voltage V_RDAC, across the first node N1, and the analog signal V_OUT corresponding to the second conversion voltage V_STDAC is output. According to an embodiment, the first boosting voltage GND is the ground voltage, but the present disclosure is not limited thereto. The first boosting voltage GND may have a voltage level different from the ground voltage in other embodiments.

The first resistor string 511 and the second resistor string 521 operate at a lower voltage. Accordingly, the power consumption may be reduced in the first resistor string 511 and the second resistor string 521.

The first conversion voltage V_RDAC corresponding to 8-bit image data signal DS <7:0> (e.g., 256 resistors) may be generated using the first resistor string 511 provided in six bits (e.g., including 64 resistors) and the second resistor string 521 provided in seven bits (e.g., including 128 resistors). Accordingly, the circuit area of the digital-analog converter may be minimized.

Figure 6:
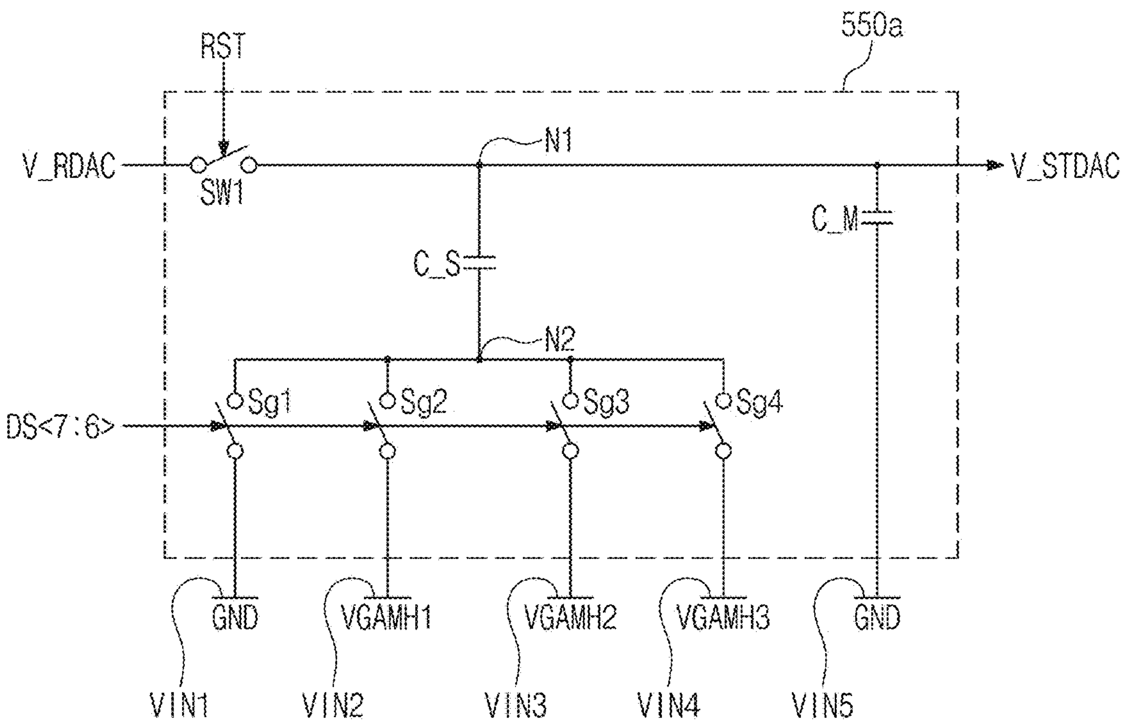
FIG. 6 is a circuit diagram of a boosting circuit according to an embodiment of the present disclosure.

FIG. 6 is a circuit diagram of a boosting circuit 550*a* according to another embodiment of the present disclosure. This boosting circuit 550*a* may be substituted for the boosting circuit 550 shown in FIG. 2.

Referring to FIG. 6, the boosting circuit 550*a* includes the switch SW1, the capacitor C_S, the boosting switches Sg1, Sg2, Sg3, and Sg4, and additionally a compensation capacitor C_M. The switch SW1, the capacitor C_S, and the boosting switches Sg1, Sg2, Sg3, and Sg4 may be the same as the switch SW1, the capacitor C_S, and the boosting switches Sg1, Sg2, Sg3, and Sg4 of the boosting circuit 550 illustrated in FIG. 2. Accordingly, the details thereof will be omitted.

The compensation capacitor C_M is connected between the first node N1 and a fifth voltage terminal VIN5. The fifth voltage terminal VIN5 may be the same or different from the voltage GND. In one embodiment, the fifth voltage terminal VIN5 may be a ground terminal to receive the ground voltage GND. The compensation capacitor C_M may be the same metal-insulator-metal (MIM) capacitor as the capacitor C_S.

Each of the boosting switches Sg1, Sg2, Sg3, and Sg4 may be implemented with a transistor, and the second amplifier 560 may include transistors. Each of the transistors of the boosting switches Sg1, Sg2, Sg3, and Sg4 and the second amplifier 560 may include a parasitic capacitor, which may cause an offset error in a digital-to-analog converter, which, in turn, may induce an incorrect conversion. When the compensation capacitor C_M has a sufficiently large capacitance, influence by parasitic capacitances of the boosting switches Sg1, Sg2, Sg3, and Sg4 and the second amplifier 560 may be reduced or minimized.

Figure 7:
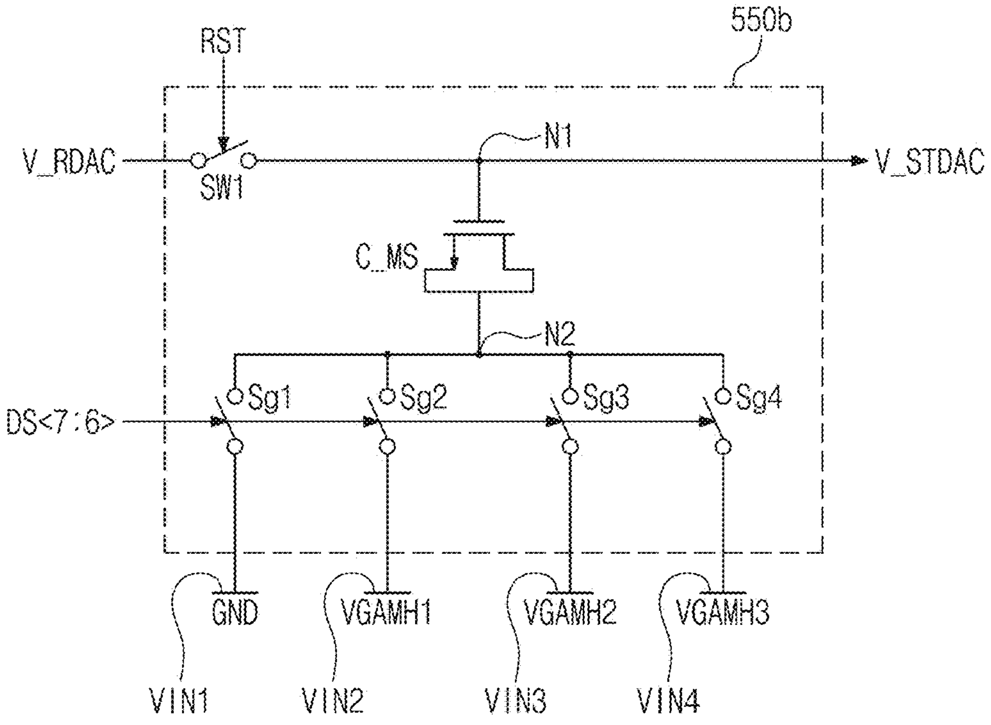
FIG. 7 is a circuit diagram of a boosting circuit according to an embodiment of the present disclosure.

FIG. 7 is a circuit diagram of a boosting circuit 550*b* according to an embodiment of the present disclosure. The boosting circuit 550*b* may replace the boosting circuit 550 in FIG. 2.

Referring to FIG. 7, the boosting circuit 550*b* includes the switch SW1, a capacitor C_MS, and the boosting switches Sg1, Sg2, Sg3, and Sg4. The switch SW1 and the boosting switches Sg1, Sg2, Sg3, and Sg4 may be the same as the switch SW1 and the boosting switches Sg1, Sg2, Sg3, and Sg4 of the boosting circuit 550 illustrated in FIG. 2. Accordingly, the details thereof will be omitted. According to an embodiment, the capacitor C_MS may be a MOS capacitor MOSCAP.

When any one of the boosting switches Sg1, Sg2, Sg3, and Sg4 is turned on, an offset error of the digital-to-analog converter depends on a ratio between the parasitic capacitance of the turned-on boosting switch and the capacitance of the capacitor C_MS. The capacitor C_MS may be formed through the same process as those of the boosting switches Sg1, Sg2, Sg3, and Sg4. Accordingly, the parasitic capacitance of the boosting switches Sg1, Sg2, Sg3, and Sg4 may be canceled (or compensated) by the parasitic capacitance of the capacitor C_MS.

Figure 8:
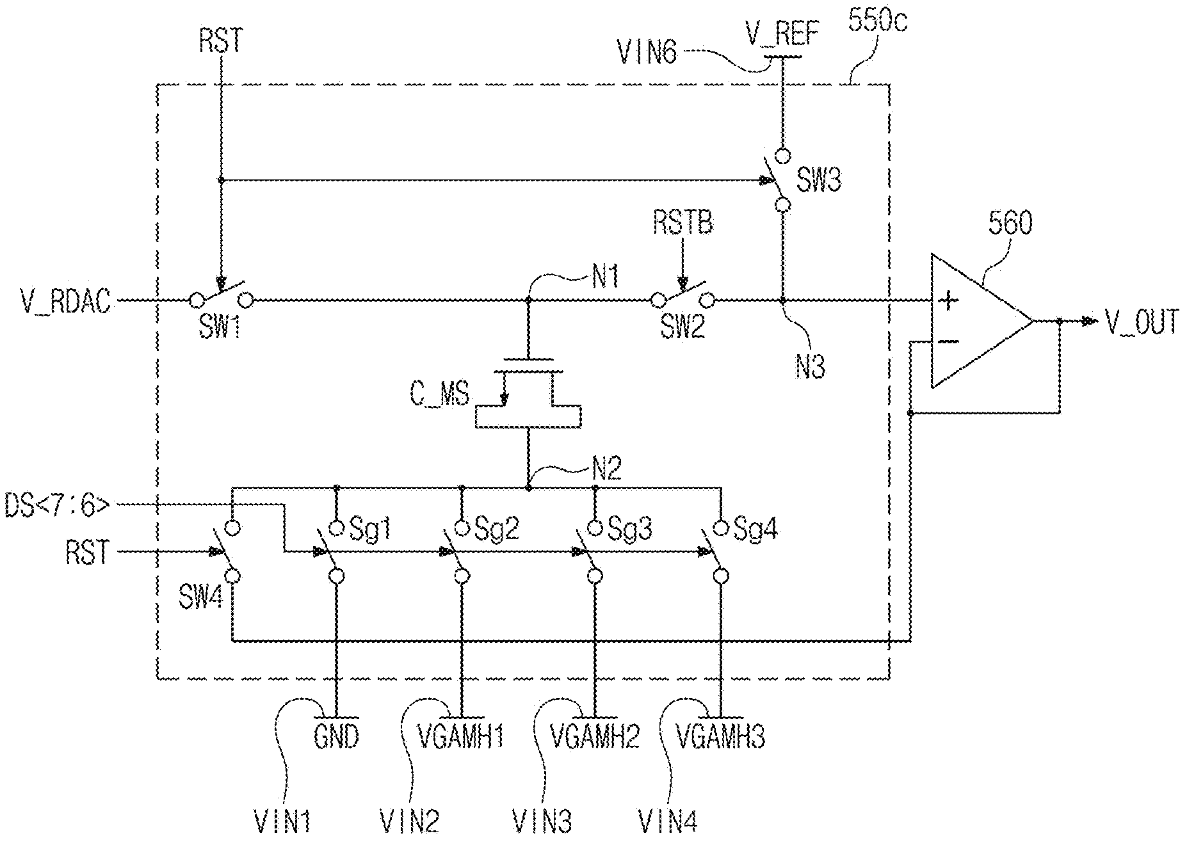
FIG. 8 is a circuit diagram of a boosting circuit and a second amplifier according to an embodiment of the present disclosure.

FIG. 8 is a circuit diagram of a boosting circuit 550*c* and the second amplifier 560 according to an embodiment of the present disclosure. The boosting circuit 550*c* may replace the boosting circuit 550 in FIG. 2.

Referring to FIG. 8, the boosting circuit 550*c* includes switches SW1, SW2, SW3, and SW4, the capacitor C_MS (e.g., as shown in FIG. 7), and the boosting switches Sg1, Sg2, Sg3, and Sg4. The switch SW1, and the boosting switches Sg1, Sg2, Sg3, and Sg4 may be the same as the switch SW1 and the boosting switches Sg1, Sg2, Sg3, and Sg4 of the boosting circuit 550 illustrated in FIG. 2. Accordingly, the details thereof will be omitted. According to an embodiment, the capacitor C_MS may be a MOS capacitor MOSCAP.

When any one of the boosting switches Sg1, Sg2, Sg3, and Sg4 is turned on, an offset error of the digital-to-analog converter depends on a ratio between the parasitic capacitance of the turned-on boosting switch and the capacitance of the capacitor C_MS.

The capacitor C_MS may be formed through the same process as those of the boosting switches Sg1, Sg2, Sg3, and Sg4. Accordingly, the parasitic capacitance of the boosting switches Sg1, Sg2, Sg3, and Sg4 may be canceled (or compensated) by the parasitic capacitance of the capacitor C_MS.

The switch SW2 is connected between the first node N1 and the third node N3, and operates in response to an inverted reset signal RSTB. The switch SW3 is connected between a sixth voltage terminal VIN6 and the third node N3 and operates in response to the reset signal RST. The switch SW4 is connected between the second node N2 and the second input terminal (−) of the second amplifier 560 and operates in response to the reset signal RST. According to an embodiment, the inverted reset signal RSTB may be a signal complementary to the reset signal RST.

When the reset signal RST is at a high level, the switches SW1, SW3, and SW4 are turned on. Accordingly, the reference voltage V_REF is provided to the third node N3 (e.g., the first (non-inverting) input terminal (+)) of the second amplifier 560, and the second node N2 is connected to the second input terminal (−) of the second amplifier 560. Thus, a capacitor sampling an offset of the second amplifier 560 and a capacitor stacking-up (or boosting) a voltage across the first node N1 may be commonly used as the capacitor C_MS. Accordingly, the parasitic capacitance of the second amplifier 560 may be offset (or compensated) by the parasitic capacitance of the capacitor C_MS.

Figure 9:
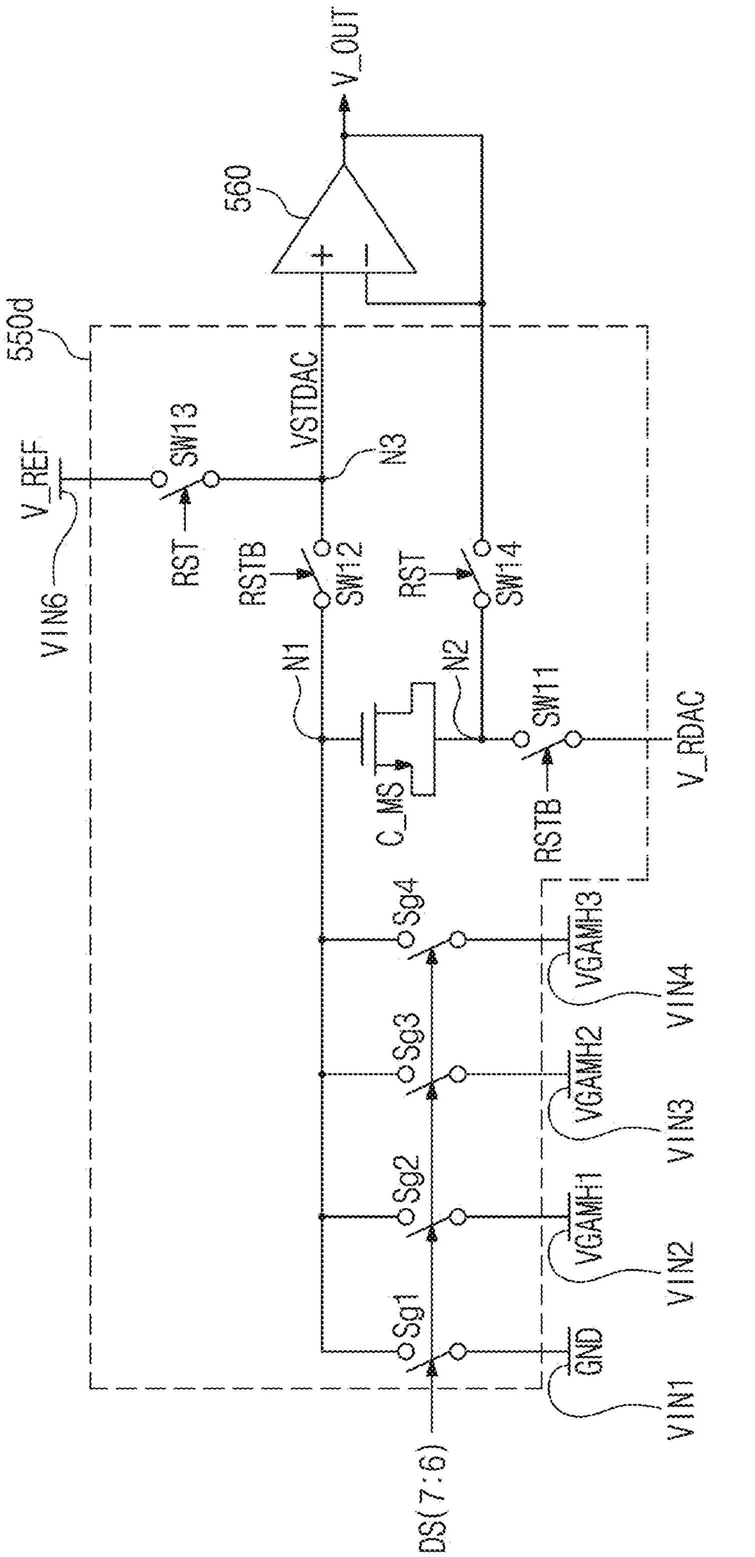
FIG. 9 is a circuit diagram of a boosting circuit and a second amplifier according to an embodiment of the present disclosure.

FIG. 9 is a circuit diagram of a boosting circuit 550*d* and a second amplifier 560 according to an embodiment of the present disclosure. The boosting circuit 550*d* may replace the boosting circuit 550 in FIG. 2.

Referring to FIG. 9, the boosting circuit 550*d* includes switches SW11, SW12, SW13, and SW14, the capacitor C_MS, and the boosting switches Sg1, Sg2, Sg3, and Sg4. The switch SW11 and the boosting switches Sg1, Sg2, Sg3, and Sg4 may be the same as the switch SW1 and the boosting switches Sg1, Sg2, Sg3, and Sg4 of the boosting circuit 550 illustrated in FIG. 2. Accordingly, the details thereof will be omitted. According to an embodiment, the capacitor C_MS may be a MOS capacitor MOSCAP.

The switch SW11 is connected between the output terminal of the first amplifier 540 illustrated in FIG. 2 (as is evident by the first conversion voltage V_RDAC) and the second node N2, and operates in response to the inverted reset signal RSTB. The switch SW12 is connected between the first node N1 and the third node N3, and operates in response the inverted reset signal RSTB. The switch SW13 is connected between the sixth voltage terminal VIN6 (which receives reference voltage V_REF) and the third node N3, and operates in response to the reset signal RST. The switch SW14 is connected between the second node N2 and the second input terminal (−) of the second amplifier 560 and operates in response to the reset signal RST. According to an embodiment, the inverted reset signal RSTB may be a signal complementary to the reset signal RST.

When the reset signal RST is at a high (or on) level, the switches SW13 and SW14 are turned on. Accordingly, the reference voltage V_REF is provided to the third node N3 (e.g., the first input terminal (+) of the second amplifier 560), and the second node N2 is connected to the second input terminal (−) of the second amplifier 560. Thus, a capacitor sampling an offset of the second amplifier 560 and a capacitor stacking-up (or boosting) a voltage across the first node N1 may be commonly used as the capacitor C_MS. Accordingly, the parasitic capacitance of the second amplifier 560 may be offset (or compensated) by the parasitic capacitance of the capacitor C_MS.

Meanwhile, when one of the boosting switches Sg1, Sg2, Sg3, and Sg4 is turned on in response to the most significant 2-bit signal DS<7:6> of the image data signal DS, the voltage across the first node N1 is changed to a corresponding one of the first to fourth boosting voltages GND, VGAMH1, VGAMH2, and VGAMH3.

When the inverted reset signal RSTB is at a high (or on) level, the switches SW11 and SW12 are turned on. The first conversion voltage V_RDAC from the first amplifier 540 illustrated in FIG. 2 may be transferred to the second node N2. In this case, the voltage across the first node N1 is stacked up (or boosted) by the first conversion voltage V_RDAC through the capacitor C_MS. Accordingly, the second conversion voltage V_STDAC becomes a voltage level corresponding to the sum of turned-on one of the first to fourth boosting voltages GND, VGAMH1, VGAMH2, and VGAMH3 and the first conversion voltage V_RDAC. Accordingly, the analog signal V_OUT output from the second amplifier 560 may correspond to a voltage level corresponding to the second conversion voltage V_STDAC across the third node N3.

Figure 10:
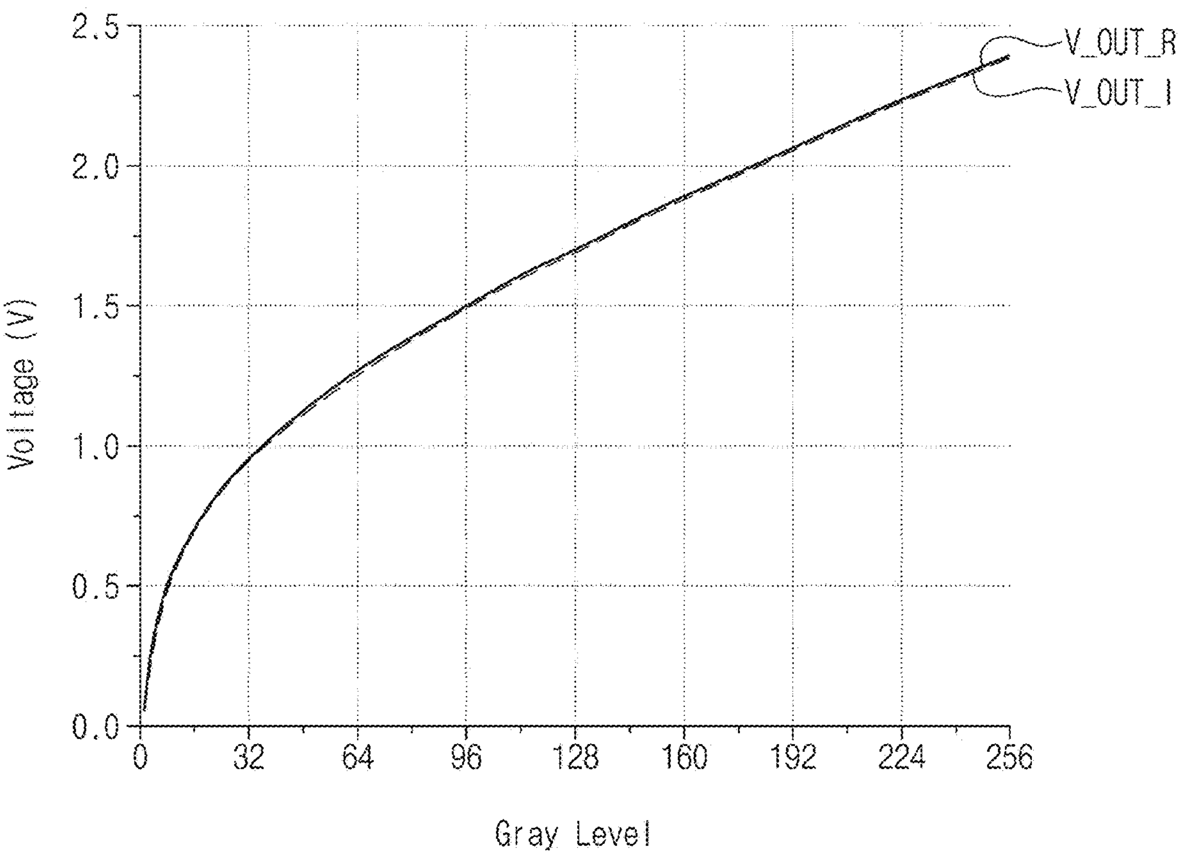
FIG. 10 is a graph illustrating an example of a voltage level of an analog signal as a function of a gray level of an image data signal.

FIG. 10 is an example of a graph illustrating a voltage level of the analog signal V_OUT as a function of a gray level of the image data signal DS. In FIG. 10, the dotted line V_OUT_I shows the voltage level of the analog signal V_OUT as a function of the gray level of the image data signal DS in an ideal case. The solid line V_OUT_R shows the voltage level of the analog signal V_OUT as a function of the gray level of the image data signal DS under the actual operation environment of the data driving circuit 200 illustrated in FIG. 2. As recognized from FIG. 10, the actual operation characteristics of the data driving circuit 200 are similar (or almost identical) to the ideal case.

Figure 11:
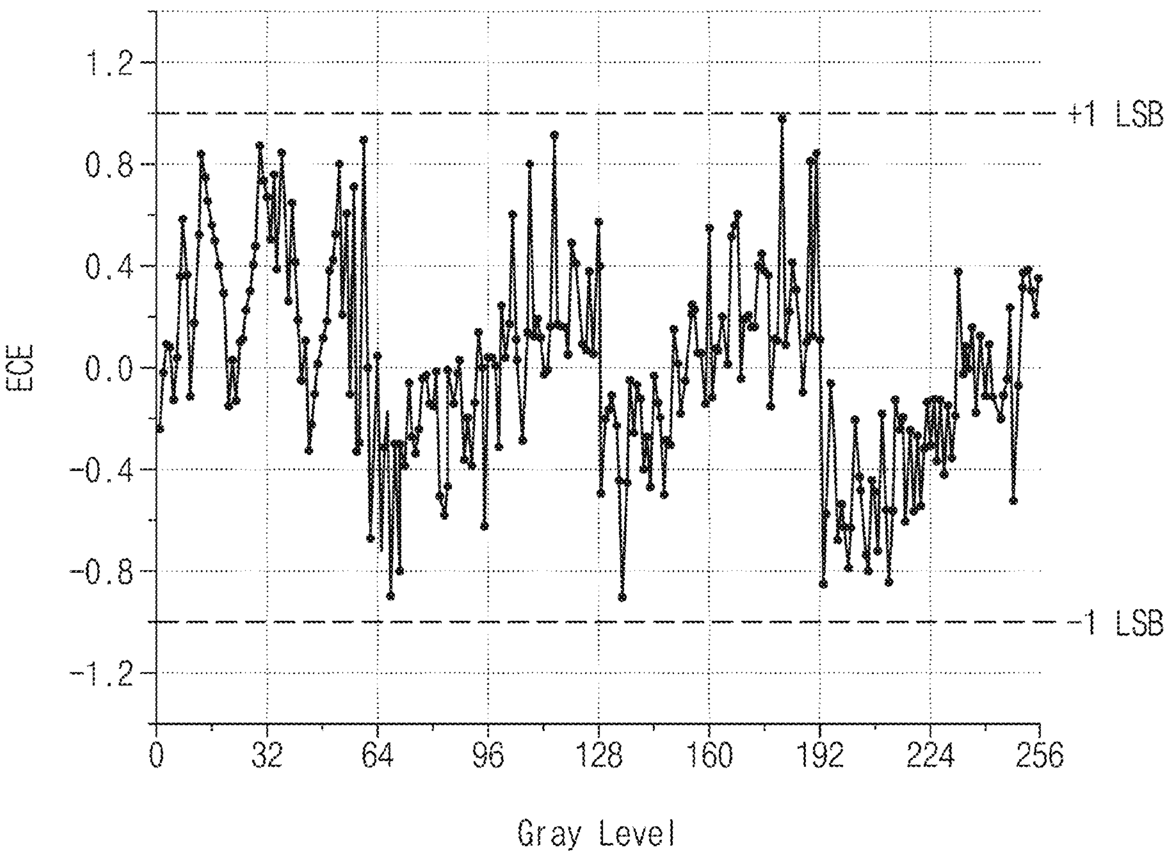
FIG. 11 is a graph illustrating an example of the error of the light emitting current of a pixel as a function of a gray level of an image data signal.

FIG. 11 is a view illustrating an example of an emission current error (ECE) of a pixel as a gray level of the image data signal DS.

Referring to FIG. 11, it may be recognized that the emission current error ECE of each of all gray levels of the image data signal DS is included within +1 and −1 in the least significant bit (LSB).

As described above, according to one or more embodiments, the digital-analog converter may be provided which operates at a lower voltage. The digital-analog converter may include resistor strings which have a reduced number of resistors, which allow a digital signal to be converted into an analog signal. Accordingly, the circuit area of the data driving circuit and the display device may be reduced.

While the present disclosure has been described with reference to embodiments thereof, it will be apparent to those of ordinary skill in the art that various changes and modifications may be made thereto without departing from the spirit and scope of the present disclosure as set forth in the following claims. The embodiments may be combined to form additional embodiments.

What is claimed is:

1. A digital-analog converter comprising:

a gamma reference voltage generator configured to output gamma reference voltages in response to a first-group signal of a digital signal;

a voltage selector configured to output, as a gamma selection voltage, one of the gamma reference voltages in response to a second-group signal of the digital signal;

a first amplifier configured to receive the gamma selection voltage and to output a first conversion voltage;

a boosting circuit configured to convert the first conversion voltage into a second conversion voltage in response to the first-group signal of the digital signal; and a second amplifier configured to receive the second conversion voltage and to output an analog signal, wherein the boosting circuit includes:

a first capacitor connected between a first node and a second node, the first capacitor configured to receive the first conversion voltage; and a boosting switching circuit configured to transmit one of a plurality of boosting voltages to the second node, in response to the first-group signal of the digital signal.

2. The digital-analog converter of claim 1, wherein the gamma reference voltage generator includes:

a first voltage generator configured to generate first gamma reference voltages in response to the first-group signal of the digital signal; and a second voltage generator configured to generate second gamma reference voltages in response to the first-group signal of the digital signal, wherein one of the first gamma reference voltages or the second gamma reference voltages is output toas the gamma reference voltages.

3. The digital-analog converter of claim 2, wherein the first voltage generator includes:

a first resistor string including a plurality of resistors configured to generate the first gamma reference voltages; and a first switching circuit configured to output the first gamma reference voltages as the gamma reference voltages in response to the first-group signal of the digital signal.

4. The digital-analog converter of claim 3, wherein the plurality of resistors of the first resistor string have mutually different resistances.

5. The digital-analog converter of claim 2, wherein the second voltage generator includes:

a second resistor string including a plurality of resistors configured to generate the second gamma reference voltages;

a second switching circuit configured to output one or more of the second gamma reference voltages corresponding to the gamma reference voltages;

a third switching circuit configured to output one or more of the second gamma reference voltages corresponding to the gamma reference voltages; and a fourth switching circuit configured to output one or more of the second gamma reference voltages corresponding to the gamma reference voltages, wherein one of the second, third, or fourth switching circuits are configured to operate in response to the first-group signal of the digital signal.

6. The digital-analog converter of claim 5, wherein the plurality of resistors of the second resistor string have mutually different resistances.

7. The digital-analog converter of claim 1, wherein the boosting switching circuit includes:

a first boosting switch connected between the second node and a first voltage terminal; and a second boosting switch connected between the second node and a second voltage terminal, wherein one of the first boosting switch or the second boosting switch is turned on in response to the first-group signal of the digital signal.

8. The digital-analog converter of claim 1, wherein the boosting switching circuit further includes a second capacitor between the first node and a ground terminal.

9. The digital-analog converter of claim 1, wherein the first capacitor is a metal-oxide-semiconductor (MOS) capacitor.

10. The digital-analog converter of claim 9, wherein the second amplifier includes:

a first input terminal configured to receive the second conversion voltage, a second input terminal, and an output terminal configured to output the analog signal, wherein the second input terminal and the output terminal are electrically connected to each other.

11. The digital-analog converter of claim 10, wherein the boosting circuit further includes:

a first switch connected between an output terminal of the first amplifier and the first node;

a second switch connected between the first node and a third node;

a third switch connected between a voltage terminal and configured to receive a reference voltage and the third node; and a fourth switch connected between the second node and the second input terminal of the second amplifier, wherein:

the first input terminal of the second amplifier is connected to the third node, each of the first switch, the third switch, and the fourth switch is turned on in response to a reset signal, and the second switch is turned on in response to an inverted reset signal.

12. The digital-analog converter of claim 1, wherein the second amplifier includes:

a first input terminal configured to receive the second conversion voltage, a second input terminal, and an output terminal configured to output the analog signal and electrically connected to the second input terminal;

wherein the boosting circuit further includes:

a first switch connected between an output terminal of the first amplifier and the second node;

a second switch connected between the first node and a third node;

a third switch connected between a voltage terminal and configured to receive a reference voltage and the third node; and a fourth switch connected between the second node and the second input terminal of the second amplifier, and wherein:

the first input terminal of the second amplifier is connected to the third node, each of the third switch and the fourth switch is configured to be turned on in response to a reset signal, and each of the first switch and the second switch is configured to be turned on in response to an inverted reset signal.

13. A data driving circuit comprising:

a digital-analog converter configured to convert an image data signal to an analog signal; and a demultiplexer configured to receive the analog signal and output a data signal, wherein the digital-analog converter includes:

a gamma reference voltage generator configured to output gamma reference voltages in response to a first-group signal of the image data signal;

a voltage selector configured to output, as a gamma selection voltage, one of the gamma reference voltages in response to a second-group signal of the image data signal;

a first amplifier configured to receive the gamma selection voltage and output a first conversion voltage;

a boosting circuit configured to convert the first conversion voltage to a second conversion voltage, in response to the first-group signal of the image data signal; and a second amplifier configured to receive the second conversion voltage and output the analog signal, wherein the boosting circuit includes:

a first capacitor connected between a first node and configured to receive the first conversion voltage and a second node; and a boosting switching circuit configured to transmit one of a plurality of boosting voltages to the second node in response to the first-group signal of the image data signal.

14. The data driving circuit of claim 13, wherein the gamma reference voltage generator includes:

a first gamma voltage generator configured to generate first gamma reference voltages in response to the first-group signal of the image data signal; and a second gamma voltage generator configured to generate second gamma reference voltages, in response to the first-group signal of the image data signal, wherein one of the first gamma reference voltages or the second gamma reference voltages is output as the gamma reference voltages.

15. An electronic device comprising:

a display panel;

a scan driving circuit configured to provide a scan signal to the display panel;

a data driving circuit configured to provide a data signal to the display panel; and a driving controller configured to provide an image data signal to the data driving circuit, wherein the data driving circuit includes:

a digital-analog converter configured to convert the image data signal to an analog signal; and a demultiplexer configured to receive the analog signal and output a data signal, and wherein the digital-analog converter includes:

a gamma reference voltage generator configured to output gamma reference voltages in response to a first-group signal of the image data signal;

a voltage selector configured to output, as a gamma selection voltage, one of the gamma reference voltages, in response to a second-group signal of the image data signal;

a first amplifier configured to receive the gamma selection voltage and output a first conversion voltage;

a boosting circuit configured to convert the first conversion voltage to a second conversion voltage, in response to the first-group signal of the image data signal; and a second amplifier configured to receive the second conversion voltage and output the analog signal, wherein the boosting circuit includes:

a first capacitor connected between a first node and a second node, the first capacitor configured to receive the first conversion voltage; and a boosting switching circuit configured to transmit one of a plurality of boosting voltages to the second node, in response to the first-group signal of the image data signal.

16. The electronic device of claim 15, wherein the gamma reference voltage generator includes:

a first voltage generator configured to generate first gamma reference voltages in response to the first-group signal of the image data signal; and a second voltage generator configured to generate second gamma reference voltages in response to the first-group signal of the image data signal, wherein one of the first gamma reference voltages or the second gamma reference voltages is output as the gamma reference voltages.

17. The electronic device of claim 15, wherein the first capacitor is an MOS capacitor.

18. A data driving circuit of a display device, comprising:

a first voltage generator configured to output a first set of gamma reference voltages based on a first value of a first predetermined number of bits of an image data signal;

a second voltage generator configured to generate a second set of gamma reference voltages based on a second value of the first predetermined number of bits of the image data signal;

a voltage selector configured to select one of the gamma reference voltages in the first set of gamma reference voltages or the second set of gamma reference voltages based on a value of a second predetermined number of bits of the image data signal; and a boosting circuit configured to generate a conversion voltage based on the selected one of the gamma reference voltages, the conversion voltage corresponding to an analog voltage to be output from the data driving circuit to a pixel of the display device, wherein the boosting circuit includes:

a first capacitor connected between a first node and a second node, the first capacitor configured to receive the selected one of the gamma reference voltages; and a boosting switching circuit configured to transmit one of a plurality of boosting voltages to the second node, in response to a first-group signal of the image data signal.

19. The data driving circuit of claim 18, wherein:

the first set of gamma reference voltages are generated based on a first highest voltage, and the second set of gamma voltages are generated based on a second highest voltage different from the first highest voltage.

20. The data driving circuit of claim 18, wherein the first predetermined number of bits and the second predetermined number of bits correspond to a gray level of the image data signal.

* * * * *